United States Patent [19]
Thornton

[11] Patent Number: 5,966,070
[45] Date of Patent: Oct. 12, 1999

[54] CHILD ALERT ALARM FOR AUTOMOBILES

[76] Inventor: Carolyn M. Thornton, 2008 Eastview Ave., Louisville, Ky. 40205

[21] Appl. No.: 08/912,484

[22] Filed: Aug. 18, 1997

[51] Int. Cl.$^6$ ........................................ B60Q 1/00
[52] U.S. Cl. ................ 340/425.5; 340/438; 340/449; 340/573.1; 340/588; 340/584; 340/522; 340/667
[58] Field of Search .................. 340/425.5, 426, 340/438, 449, 459, 573, 522, 588, 589, 666, 584, 667; 374/142, 100, 133

[56] References Cited

U.S. PATENT DOCUMENTS 4,107,941  8/1978  Hamilton .................................. 236/49
5,054,686 10/1991  Chuang .................................. 236/49.3
5,416,728  5/1995  Rudzewicz et al. ..................... 340/588

Primary Examiner—Donnie L. Crosland
Attorney, Agent, or Firm—Armstrong Teasdale LLP

[57] ABSTRACT

The present invention, in one form, is an alarm system for detecting the presence of a child locked within a parked automobile during extreme temperatures. The alarm system includes a temperature detecting element and a child detecting element electrically coupled to an AND gate. The temperature detecting element transmits an extreme temperature signal to the AND gate if the temperature within the automobile exceeds a pre-selected maximum temperature. The child detecting element transmits a child detection signal to the AND gate when it detects a child within the automobile. The AND gate, upon receiving both the child detection signal and the extreme temperature signal, transmits and alarm signal.

15 Claims, 3 Drawing Sheets

5,966,070

CHILD ALERT ALARM FOR AUTOMOBILES

FIELD OF THE INVENTION

This invention relates generally to alarm systems and, more particularly, to temperature alarm systems implemented in connection with automobiles.

BACKGROUND OF THE INVENTION

Automobile operators sometimes park their automobiles and inadvertently leave their pets inside the automobile, particularly in the back seat. Similarly, some automobile owners have been known to inadvertently lock their children in a parked automobile. Likewise, children have been known to inadvertently lock themselves in a parked automobile. If the pet or child is trapped in the automobile for an extended period of time, or during extreme temperatures, the pet or child typically suffers adverse health effects. In at least one instance, a child inadvertently trapped in a parked automobile during extreme temperatures has died.

At least one automobile alarm system protects an automobile from vandalism and burglary. The alarm system sounds an alarm when a locked automobile door is opened without a key. Another known alarm system sounds an alarm upon physical contact with the exterior of a locked automobile. Such alarm systems, while effective for preventing an automobile from vandalism and burglary, do not detect the presence of a person or animal confined within a locked automobile during extreme temperatures.

To increase the safety of a child within a car, safety devices such as car seats have been developed. However, each of the known safety devices is designed to increase a child's safety while the automobile is moving, i.e., during automobile operation. Such devices do not prevent a child from inadvertently being locked in a parked automobile during extreme temperatures.

It would be desirable to provide an apparatus for detecting the presence of a child within a parked automobile during extreme temperatures. It also would be desirable to provide such an apparatus that is simple to fabricate and install in an automobile.

SUMMARY OF THE INVENTION

These and other objects may be attained by an alarm system which, in one embodiment, includes a temperature detecting element for detecting the temperature within an automobile and a child detecting element for detecting the presence of a child in the automobile. Particularly, the alarm system is electrically coupled to the automobile battery and includes the temperature detecting element, the child detecting element, and an alarm element. The temperature detecting element is electrically coupled to a first input of the alarm element. The child detecting element includes a normally open switch and is electrically coupled to a second input of the alarm element. The alarm element is electrically coupled to a sounding element and is configured to activate, e.g., sound, the sounding element.

In operation, the alarm system is coupled to a child safety seat positioned within the automobile and is energized, e.g., turned on, when a child is positioned in the safety seat. The temperature detecting element includes a thermistor which detects the temperature of the interior of the automobile, and the detected temperature is compared to a pre-determined extreme temperature. If the detected temperature is greater than a maximum temperature or less than a minimum temperature, an extreme temperature signal is transmitted to the alarm element. The child detecting element detects whether a child is positioned in the child safety seat and transmits a child detection signal to the alarm element once the presence of a child is detected. Upon receiving both an extreme temperature signal and a child detection signal, the alarm element transmits an alarm signal, and the alarm signal activates the sounding alarm.

The alarm system described above is believed to detect the presence of a child within a parked automobile during extreme temperatures to prevent inadvertently leaving the child in the automobile. Such alarm system also is believed to be simple to fabricate and install in an automobile.

DETAILED DESCRIPTION

Figure 1:
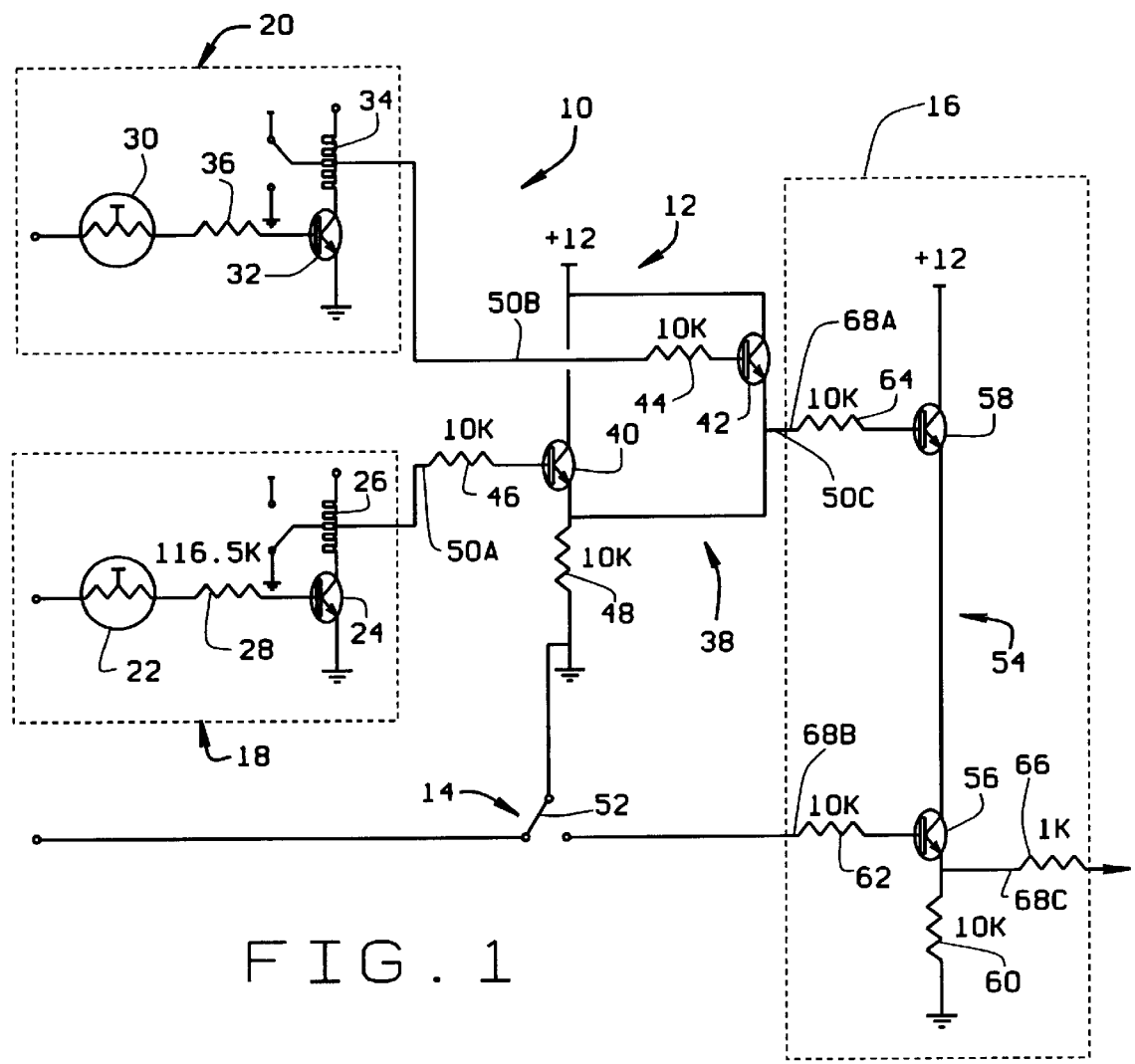
FIG. 1 is a schematic illustration of an alarm system in accordance with one embodiment of the present invention.

FIG. 1 is a schematic illustration of an alarm system 10 in accordance with one embodiment of the present invention. Alarm system 10 includes a temperature detecting element 12, a child detecting element 14, and an alarm element 16. Temperature detecting element 12 includes a first, or heat, detecting circuit 18 and a second, or cold, detecting circuit 20. First detecting circuit 18 is configured to detect an extreme warm temperature within the automobile (not shown in FIG. 1) and second detecting circuit 20 is configured to detect an extreme cold temperature within the automobile. Particularly, first detecting circuit 18 includes a first thermistor 22, a first transistor 24 and a first relay coil 26. A first resistor 28 is connected in electrical series circuit between first thermistor 22 and first transistor 24, and first transistor 24 is electrically coupled to relay coil 26. First thermistor 22 is a variable resistor configured to increase in resistance as an ambient temperature decreases and configured to decrease in resistance as the ambient temperature increases. First thermistor 22 is configured to trigger first transistor 24 when an the ambient temperature is higher than a maximum pre-selected temperature such as, e.g., 35 degrees Celsius. As one specific example, first thermistor 22 is configured to have a resistance of 10K ohms at an ambient temperature of 25 degrees Celsius and to have a resistance of 7K ohms at an ambient temperature of 35 degrees Celsius. Of course, first thermistor 22 may be configured to have different resistances at different temperatures. First resistor 28 may, for example, have a resistance of 116.5K ohms.

Similarly, second detecting circuit 20 includes a second thermistor 30, a second transistor 32 and a second relay coil 34. A second resistor 36 is connected in electrical series circuit between second thermistor 30 and second transistor 32, and second transistor 32 is electrically coupled to relay coil 34. Second thermistor 30 is a variable resistor configured to decrease in resistance as an ambient temperature decreases and configured to increase in resistance as the ambient temperature increases. Second thermistor 30 is configured to trigger second transistor 32 when an the ambient temperature is lower than a minimum pre-selected temperature such as, e.g., 0 degrees Celsius. Second resistor 36 may, for example, have a resistance of 589 ohms.

Temperature detecting element 12 further includes an electrical OR gate 38 which includes two transistors 40 and 42 and three resistors 44, 46 and 48, respectively. OR gate 38 further includes first and second input portions 50A and 50B, respectively, and an output portion 50C. First detecting circuit 18 is electrically coupled to first input portion 50A and second detecting circuit 20 is electrically coupled to second input portion 50B. Particularly, first relay coil 26 is electrically coupled to first input portion 50A and second relay coil 34 is coupled to second input portion 50B. Resistors 44, 46 and 48 may each have a resistance, for example, of 10K ohms.

Child detecting element 14 includes a normally open switch 52 and is configured to detect the presence of a child in the automobile. Particularly, switch 52 is configured to move to a closed position if a child is in the automobile. For example, normally open switch 52 may be a lever switch coupled to a child safety seat and configured to close if a child is positioned in the safety seat.

Alarm element 16 includes an electrical AND gate 54 having two transistors 56 and 58, respectively, and four resistors 60, 62, 64, and 66, respectively. AND gate 54 further includes first and second input portions 68A and 68B, respectively, and an output portion 68C. Output portion 50C of electrical OR gate 38 is electrically coupled to first input portion 68A and normally open switch 52 is electrically coupled to second input portion 68B. Output portion 68C of AND gate 54 is electrically coupled to a sounding element, or alarm, (not shown in FIG. 1) and is configured to activate, i.e., sound, the sounding element. Resistors 60, 62 and 64 may each have a resistance, for example, of 10K ohms. Resistor 66 may have a resistance, for example, of 1K ohms.

Figure 2:
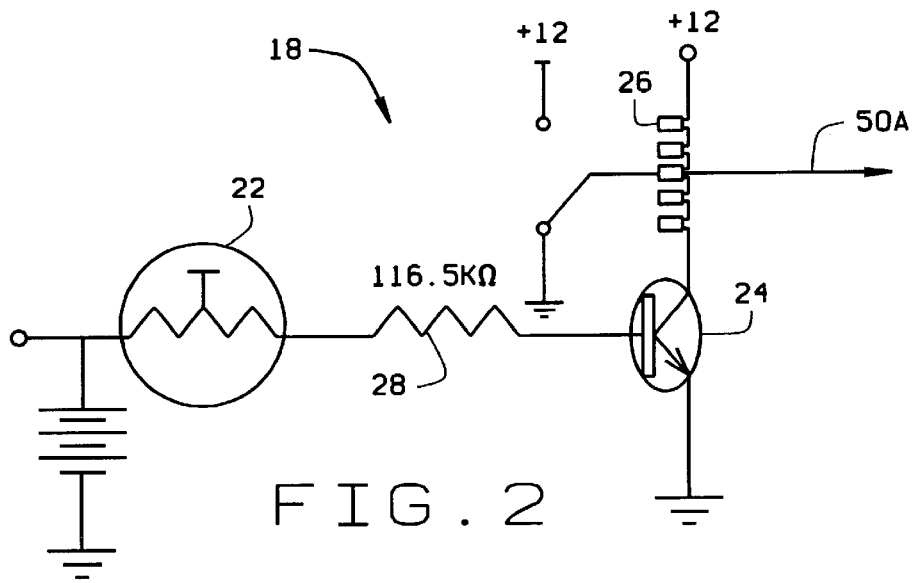
FIG. 2 is a schematic illustration of the first detecting circuit shown in FIG. 1.
Figure 3:
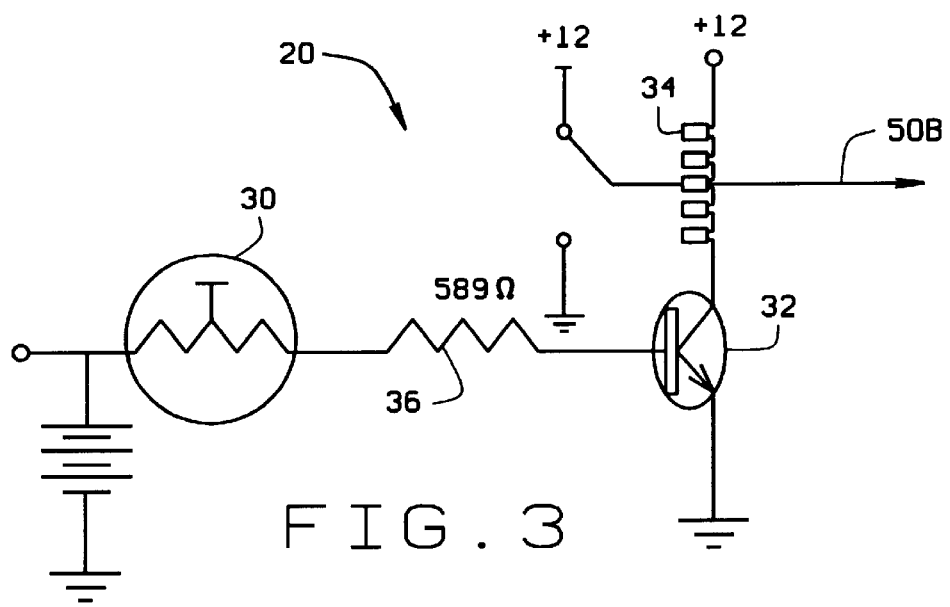
FIG. 3 is a schematic illustration of the second detecting circuit shown in FIG. 1.
Figure 4:
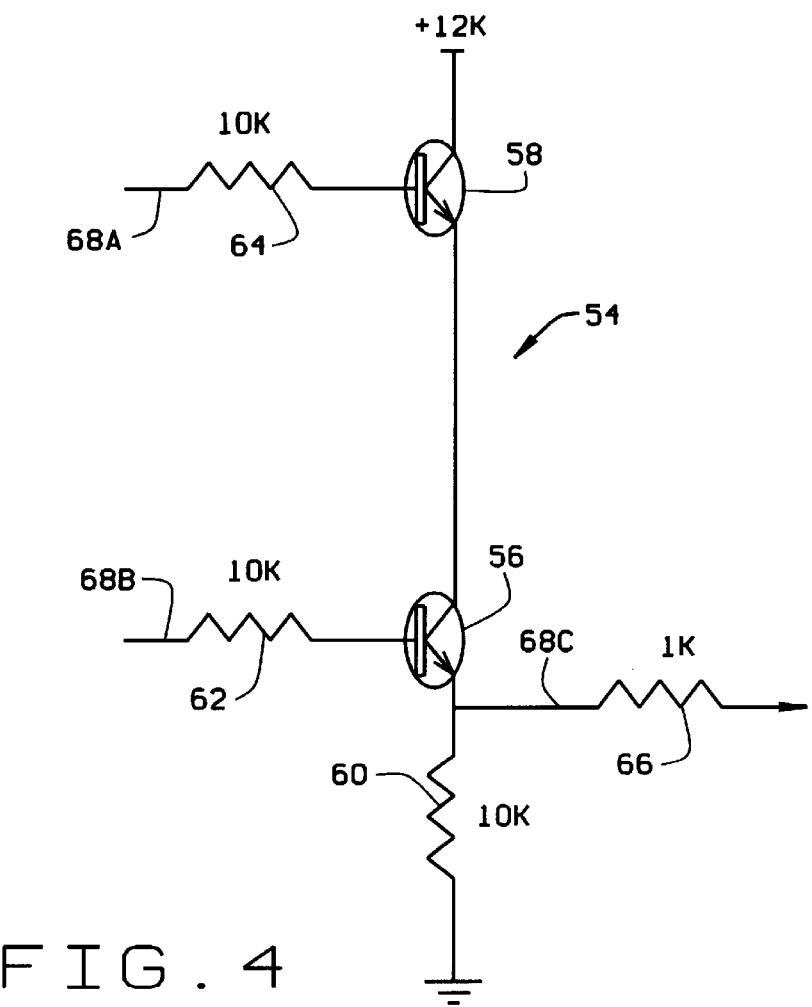
FIG. 4 is a schematic illustration of the electrical AND gate shown in FIG. 1.
Figure 5:
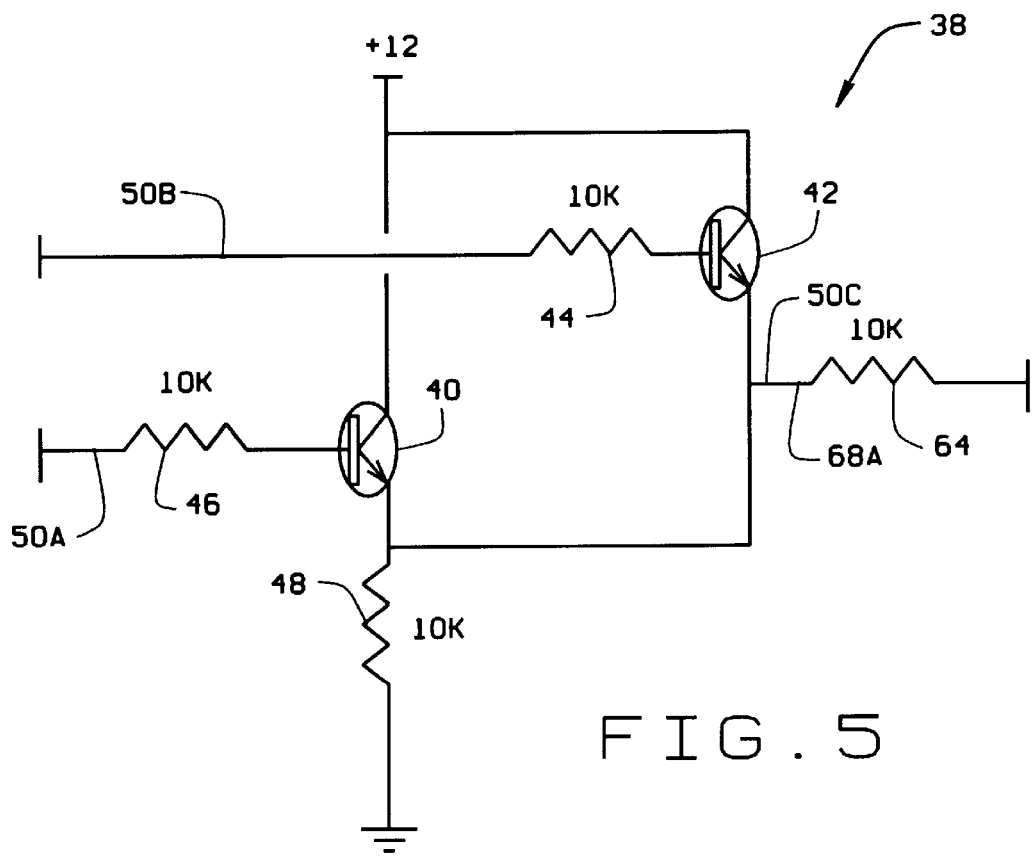
FIG. 5 is a schematic illustration of the electrical OR gate shown in FIG. 1.

FIG. 2 is a schematic illustration of first detecting circuit 18. FIG. 3 is a schematic illustration of second detecting circuit 20. FIG. 4 is a schematic illustration of electrical AND gate 54. FIG. 5 is a schematic illustration of electrical OR gate 38. Exemplary values for the respective circuit elements are shown in FIGS. 2–5.

In operation, a child safety seat is positioned in the automobile, and alarm system 10 is coupled to the automobile battery via a normally open alarm switch (not shown). The alarm switch may, for example, be a lever switch, and is configured to close when a child is positioned in the child safety seat so that power from the car battery is supplied to alarm system 10.

Figure 6:
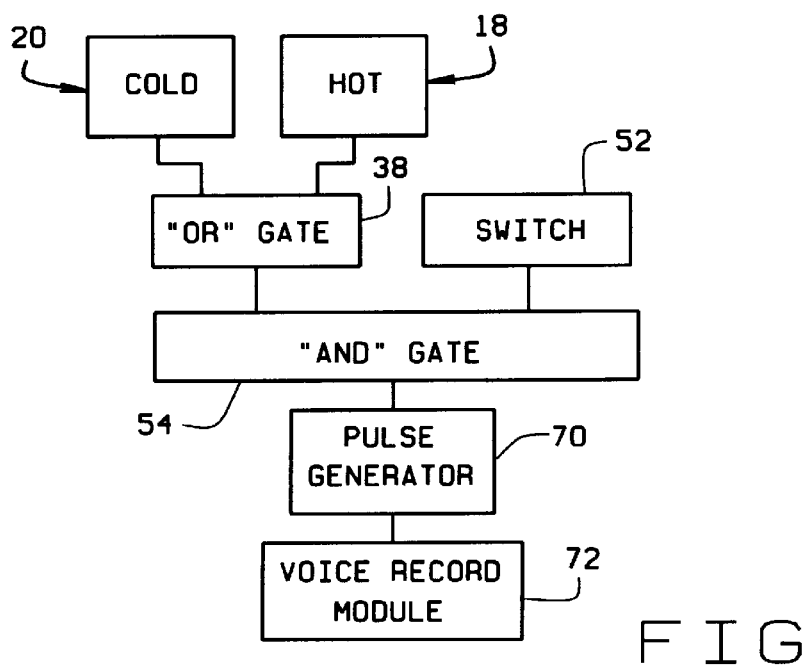
FIG. 6 is a flow chart illustration of the operation of the alarm system shown in FIG. 1.

After alarm system 10 is powered, and referring now to FIG. 6, temperature detecting element 12 detects a temperature of the interior of the automobile. If the detected temperature is an extreme heat temperature, e.g., higher than the pre-selected maximum temperature, the resistance of first thermistor 22 decreases sufficiently to trigger first transistor 24 and charge first relay coil 26 to transmit an extreme hot temperature signal to first input portion 50A of electrical OR gate 38. If the detected temperature is an extreme cold temperature, e.g., below the pre-selected minimum temperature, the resistance of second thermistor 30 increases sufficiently to trigger second transistor 32 and charge second relay coil 34 to transmit an extreme cold temperature signal to second input portion 50B of electrical OR gate 38. If the detected temperature is neither an extreme heat temperature nor an extreme cold temperature, then neither detecting circuit 18 and 20 transmit a signal to OR gate 38. If electrical OR gate 38 receives either an extreme cold temperature signal or an extreme hot temperature signal, electrical OR gate 38 transmits an extreme temperature signal to first input portion 68A of electrical AND gate 54.

Normally open switch 52 is coupled to the child safety seat and is configured to close if a child is in the safety seat. If normally open switch 52 closes, child detecting element 14 transmits a child detection signal to second input portion 68B of electrical AND gate 54.

If electrical AND gate 54 receives both an extreme temperature signal and a child detection signal, electrical AND gate transmits an alarm signal to a pulse generator 70, which activates, e.g., sounds, a voice record module 72. Voice record module 72 may be configured, for example, to produce a siren sound which is audible from outside the automobile. Of course, voice record module may be configured to produce other sounds. Alternatively, electrical AND gate 54 may be configured to transmit the alarm signal to the automobile horn and to sound the horn.

Transistors, resistors, AND gates, and OR gates are well known. Similarly, thermistors are well known.

The above described alarm system is believed to detect the presence of a child within a parked automobile during extreme temperatures and to prevent inadvertently leaving the child in the automobile. Such alarm system also is believed to be simple to fabricate and install in the automobile.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A method for detecting a child in a parked automobile during extreme temperatures using an alarm system, the alarm system including a child detecting element and a temperature detecting element, said temperature detecting element being connected to an electrical OR gate, said method comprising the steps of:

determining whether a child is in the automobile utilizing the child detecting element;

determining whether an actual temperature within the automobile is above an extreme maximum temperature or below an extreme minimum temperature, utilizing the electrical OR gate of the temperature detecting element; and activating an alarm if a child is detected in the automobile and if the temperature is above an extreme maximum temperature or below an extreme minimum temperature.

2. A method in accordance with claim 1 wherein the minimum temperature is approximately 0 degrees Celsius.

3. A method in accordance with claim 1 wherein the maximum temperature is approximately 35 degrees Celsius.

4. A method in accordance with claim 1 wherein the automobile includes a horn, and wherein activating the alarm comprises the step of transmitting an alarm signal to the horn.

5. An alarm system for an automobile, said alarm system comprising:

a temperature detecting element comprising a first detecting circuit, a second detecting circuit, and an electrical OR gate having a first OR gate input and a second OR gate input, said first detecting circuit coupled to said first OR gate input, said second detecting circuit coupled to said second OR gate input;

a child detecting element; and an alarm element having a first alarm input and a second alarm input, said temperature detecting element coupled to said first alarm input, said child detecting element coupled to said second alarm input, said alarm element comprising an electrical AND gate, said electrical AND gate being configured to transmit an alarm signal in response to the combined first and second alarm inputs.

6. An alarm system in accordance with claim 5 wherein the automobile includes a battery, and wherein said alarm system is configured to couple to the automobile battery.

7. An alarm system in accordance with claim 5 wherein said first detecting circuit comprises a thermistor configured to increase in resistance as an ambient temperature decreases and configured to decrease in resistance as the ambient temperature increases.

8. An alarm system in accordance with claim 5 wherein said second detecting circuit comprises a thermistor configured to decrease in resistance as an ambient temperature decreases and configured to increase in resistance as the ambient temperature increases.

9. An alarm system in accordance with claim 5 wherein said child detecting element comprises a normally open switch.

10. An alarm system in accordance with claim 5 wherein the automobile includes a child safety seat positioned therein, and wherein said child detecting element is configured to couple to the child safety seat.

11. An alarm system configured to couple to an automobile and comprising:

a temperature detecting element comprising a first detecting circuit, a second detecting circuit, and an electrical OR gate having a first input and a second input, said first detecting circuit coupled to said first input, said second detecting circuit coupled to said second input;

a child detecting element; and an alarm element for receiving signals from said temperature detecting element and said child detecting element, said alarm element configured to activate an alarm in response to the combined received signals.

12. An alarm system in accordance with claim 11 wherein said alarm element comprises an electrical AND gate.

13. An alarm system in accordance with claim 11 wherein said first detecting circuit comprises a thermistor configured to increase in resistance as an ambient temperature decreases and configured to decrease in resistance as the ambient temperature increases.

14. An alarm system in accordance with claim 11 wherein said second detecting circuit comprises a thermistor configured to decrease in resistance as an ambient temperature decreases and configured to increase in resistance as the ambient temperature increases.

15. An alarm system in accordance with claim 11 wherein said child detecting element comprises a normally open switch.

\* \* \* \* \*